Patented May 23, 1944

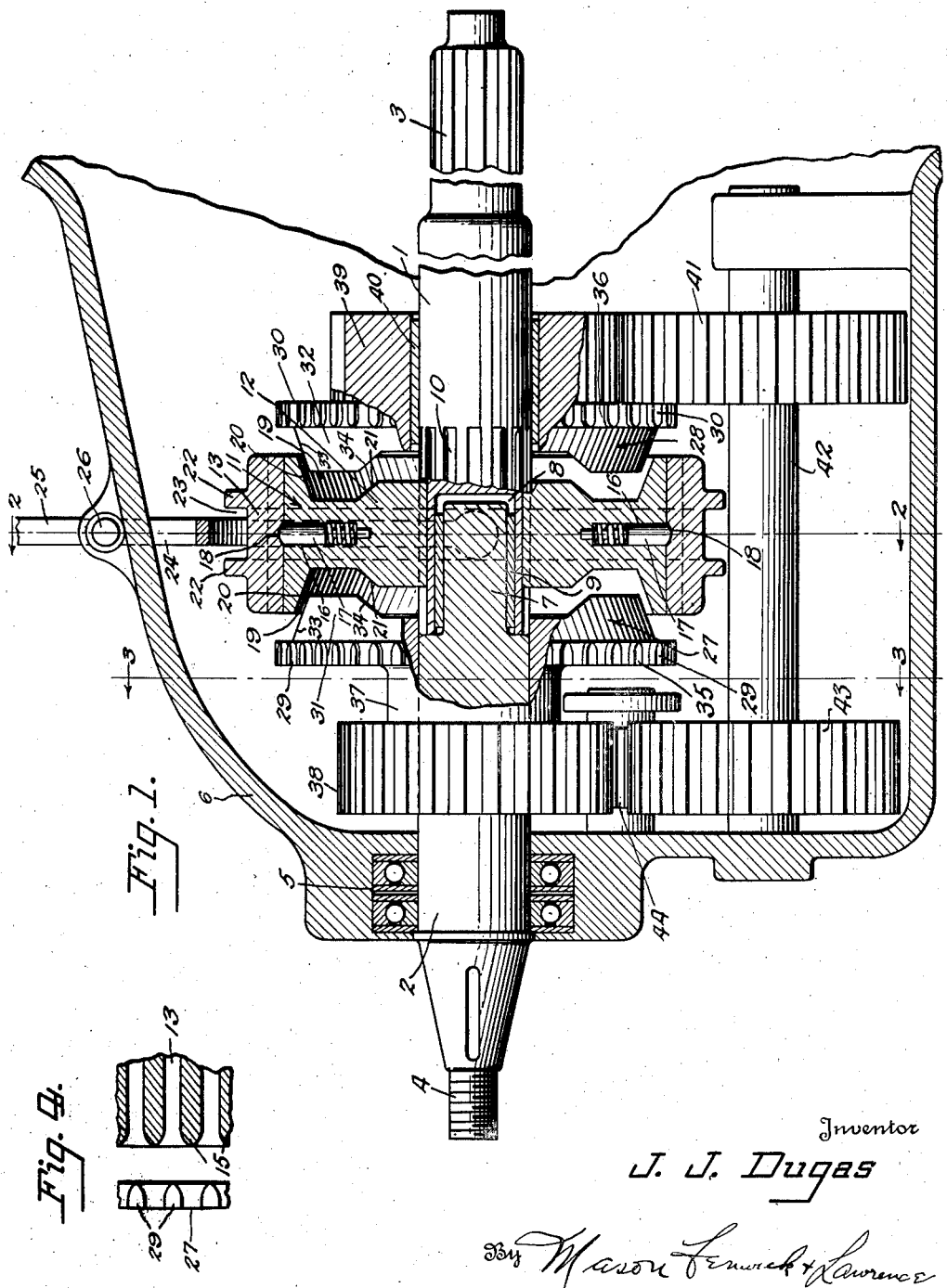

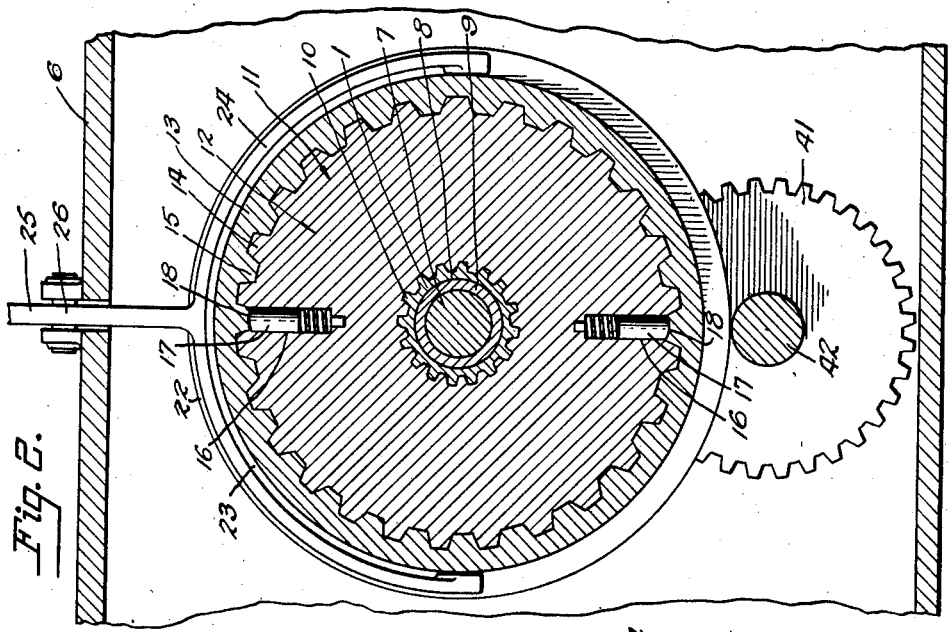

2,349,491

UNITED STATES PATENT OFFICE 2,349,491

SYNCHRO-SHIFTING TRANSMISSION CLUTCH

Joseph J. Dugas, New Orleans, La., assignor to Higgins Industries, Inc., New Orleans, La., a corporation of Louisiana Application December 1, 1942, Serial No. 467,520

1 Claim. (Cl. 192—53)

This invention relates to a synchronized transmission clutch, particularly designed for marine installations in which it is customary to have the propeller rotate at substantially the same number of R. P. M. in reverse as in forward direction whereby to employ the propeller in reverse as an efficient brake.

One of the objects of the invention is to provide a transmission clutch which engages the driving and driven members, both for forward and reverse operation, frictionally in the initial movement whereby the driven member is brought up smoothly to the speed of the driving member, and then positively, in the subsequent movement, so that positive engagement is effected by a single movement of the operating lever without noise or clash of the interengaging mechanisms and without requiring any timing judgment on the part of the operator. This is extremely important in reversing, for it is frequently necessary to put the boat in reverse suddenly, to avoid collision, which act, in a positively engaging clutch is apt to result in stripping of gears or in failure of the clutch to engage at all, in the absence of the initially acting frictional synchronizing means.

Other objects of the invention will appear as the following description of a preferred and practical embodiment thereof proceeds.

In the drawings which accompany and form a part of the following specification, and throughout the several figures of which the same reference characters have been employed to designate identical parts:

Figure 1 is a longitudinal vertical cross-section through a synchro-shifting transmission clutch embodying the features of the subject invention;

Figure 2 is a cross-section taken along the line 2—2 of Figure 1;

Figure 3 is a cross-section taken along the line 3—3 of Figure 1; and

Figure 4 is a fragmentary detail partly in section, showing the chamfered ends of the interengaging teeth by which the clutch is positively engaged.

Referring now in detail to the several figures, the numerals 1 and 2 represent, respectively, the driving and driven shafts, the former being provided with the splined zone 3 by which it is connected to the internal combustion engine of the marine power plant, and the latter having a threaded end 4 by means of which it is connected to the propeller shaft coupling. The driven shaft 2 is carried in a bearing 5 in the transmission housing 6. The forward end of the driven shaft 2 has a portion 7 of reduced diameter which extends into a bore 8 in the adjacent end of the driving shaft 1, a sleeve bearing 9 of suitable wear resisting material intervening. The driving and driven shafts, as shown, are coaxial and normally relatively rotatable.

The driving shaft 1 is provided with a zone of splines 10 overlying that region in which the driving shaft surrounds the driven shaft. A movable clutch member, which as a whole is designated by the reference character 11, is mounted upon the driving shaft slidably upon the splines 10 and rotates with the driving shaft. The movable clutch member 11 consists essentially of two parts, the drum 12 and the peripheral sleeve 13. The drum 11 is provided on its outer circumference with a series of spline teeth 14, (see Figure 2), and the peripheral sleeve 13 is provided on its inner circumference with a series of spline teeth 15 which interdigitate with the spline teeth 14, so that the peripheral sleeve 13 is rotatable with the drum 12, but slidable in either direction relative to said drum.

The drum is provided with radial bores 16 opening in its circumferential surface and housing the spring projected detents 17 which engage in depressions 18 formed in the outer circumferential surface of the drum 12. Thus normally, the peripheral sleeve 13 resists lateral displacement until the pressure of the detents 17 has been overcome. On both sides, the drum 12 is provided with annular depressions 19 with inwardly convergent walls 20 and 21 which serve as friction faces for the movable member of the clutch. The peripheral sleeve 13 is provided on its outer circumference with the spaced ribs 22, forming between them an annular channel 23 which receives the arcuate yoke 24 at the lower end of the clutch operating lever 25, the latter being pivoted at the intermediate point 26 to the housing 6.

It will be obvious from the above description of the movable clutch member 11 that when the lever 25 is shifted either to the right or left, as viewed in Figure 1, the movable clutch member will first move as a whole and then when resistance has been encountered to its further movement, the pressure of the detent will be overcome and the peripheral sleeve 13 will move laterally relative to the drum 12.

The movable clutch member 11 is flanked on both sides by the complementary clutch members 27 and 28, the former being employed for forward drive, and the latter for reverse. Each of these clutch members comprises a flange 35 and 36, respectively, having the respective external teeth 29 and 30, said flanges being of such diameter that the teeth 29 and 30 are in alignment with the spline teeth 15 of the peripheral sleeve 13 so as to be engaged by said spline teeth when the peripheral sleeve 13 slides beyond the drum 12 when released from the detents 17. The complementary clutch members 27 and 28 also have the respective annular ribs 31 and 32 with outwardly convergent walls 33 and 34 tapered to correspond to the walls 20 and 21 of the movable clutch member and adapted to frictionally engage said walls when the movable clutch member is shifted into contact with either of the complementary clutch members. The frictionally engaging portions of the movable and complementary clutch members are so constructed that when they are in full frictional engagement the gear teeth 29 and 30 on the complementary clutch members are still laterally spaced from the spline teeth 15 of the peripheral sleeve 13, allowing a brief time interval to automatically elapse between the full frictional engagement position of the movable and complementary clutch members and the positive engagement of the peripheral sleeve 13 with the teeth 29 or 30.

The flange 35 is formed at the inner end of a hub 37 fixed to the driven shaft 2, and which is unitary with a gear 38. The flange 36 is formed at the inner end of a gear 39 which is rotatably mounted on the driving shaft on a bearing 40. The gear 39 is permanently in mesh with a gear 41 fixed to the lay shaft 42, which lay shaft also carries a gear 43 fixed thereto, which last named gear is connected through an idler 44 to the gear 38 fixed to the driven shaft. When the movable clutch member 11 is in engagement with the complementary clutch member 27, the driven shaft is directly driven. When the movable clutch member 11 is in engagement with the complementary clutch member 28, the driving torque is transmitted through the gears 39 and 41, lay shaft 42, gears 43, 44 and 38 to the driven shaft. The interposition of the idler gear 44 reverses the direction of rotation of the driven shaft. It will be noted that the gears 38 and 43 have a one to one relation, as do also the gears 39 and 41, so that in the illustrated embodiment of the invention there is no gear reduction in reverse and the propeller rotates with the same number of R. P. M. in reverse direction as in the forward direction.

In operation, assuming that the operating lever is shifted to the left in Figure 1, which is the reverse direction, the movable clutch member 11 which is permanently connected to the driving shaft 1 is moved to the right until the frictional clutch faces 20, 33 and 21, 34 are brought into engagement, whereupon the gear 39 and the gears in train therewith will be smoothly brought up to the speed of the driving shaft. When the movable clutch member 11 is brought up into abutment with the frictional faces of the complementary clutch member 28 which can move no further, so that further movement of the operating lever 25 in a reverse direction overcomes the pressure of the detents 17 so that the peripheral sleeve 13 moves out to the right, as viewed in Figure 1, the spline teeth 15 coming into mesh with the teeth 30 on the gear 36. This will positively engage the driving and driven members of the clutch.

In a marine installation, a positively coupled clutch has the great advantage over a friction clutch, in that the pressure of contact of a friction clutch varies, due to the weaving of the hull as the waves pass beneath it. When the hull bridges two waves, it weaves downwardly in the middle. When a single wave is beneath the middle and the ends unsupported it weaves upwardly. This weaving creates slight fluctuations in the distance between the internal combustion engine and propeller and creates variations in clutch pressure which causes frequent slippage of a friction clutch. This objection is obviated by the employment of a positively coupled clutch, but such a clutch has the drawback that when it is attempted to suddenly engage it, the gears of the driving and driven elements may not be in alignment, and the clutch may not engage at all. This is an extremely hazardous condition, particularly when the clutch lever is suddenly moved to reverse in the attempt to avoid collision. Stripping of the gears frequently occurs, and at all times unless the operator has an experienced timing judgment, the engagement of the clutch either in forward or reverse directions is accompanied by noise and clash of the gears. All of this is obviated by having the clutch take hold frictionally in the initial movement of the operating lever and automatically pass from frictional to positive engagement as soon as the speeds of the driving and driven clutch elements have been frictionally synchronized.

Referring again to Figure 1, when it is desired to engage the clutch in forward position, the operating lever is shifted to the right, the movable clutch element 11 slides to the left until the drum is in frictional engagement with the complementary clutch member 27, in which position the drum can move no further. Further continuing movement of the operating lever causes the peripheral sleeve 13 to overcome the detents 17 and move leftward until the spline teeth 15 engage the teeth 29 of the gear 35. It will be noted from Figure 4 that the adjacent ends of the sprine teeth 15 and the teeth on the respective gears 35 and 36 are chamfered so that they will readily pass into mesh when the speeds of the movable and complementary clutch members have been synchronized.

While I have in the above description defined what I believe to be a preferred and practical embodiment of the invention, it will be understood to those skilled in the art that the specific details of construction and arrangement of parts are by way of example and not to be construed as limiting the scope of the invention as defined in the appended claim.

What I claim as my invention is:

Synchro-shifting transmission clutch comprising normally relatively rotatable axial driving and driven shafts, a gear freely rotatable on the driving shaft, a gear fixed to the driven shaft, said gears being permanently connected through a train of gearing including a reverse idler and having a substantially one to one ratio, a slidable clutch member between said gears splinably mounted on said driving shaft to rotate therewith and slide thereupon comprising a drum having annular grooves of angular cross-section on opposite sides and a sleeve mounted about the periphery of said drum having internal faces splinably interdigitating with external teeth on the periphery of said drum, whereby said sleeve is slidable laterally beyond either side of said drum, a spring detent normally maintaining said sleeve in fixed mid-position to said drum, said gears being parts of respective complementary clutch members each including an annular flange of angular cross-section positioned to be engaged by the adjacent friction faces of the adjacent annular groove of said drum, each clutch member having teeth about its periphery positioned to be engaged by the teeth of said sleeve when in laterally extended position, and an operating lever for moving said clutch member into engagement with either of said complementary clutch members whereby the friction faces of said drum first engage the corresponding friction faces of the complementary clutch member, limiting the sliding movement of said drum, further movement of said operating lever in the same direction overcoming said detent and bringing the teeth of said sleeve into engagement with the teeth of the adjacent flange.

JOSEPH J. DUGAS.